United States Patent [19]

Langendorf

[11] Patent Number: 4,942,520

[45] Date of Patent: Jul. 17, 1990

[54] METHOD AND APPARATUS FOR INDEXING, ACCESSING AND UPDATING A MEMORY

[75] Inventor: Brian K. Langendorf, Worcester, Mass.

[73] Assignee: Prime Computer, Inc., Natick, Mass.

[21] Appl. No.: 80,453

[22] Filed: Jul. 31, 1987

[51] Int. Cl.⁵ .................... G06F 9/34; G06F 9/355; G06F 9/38

[52] U.S. Cl. .................... 364/200; 364/231.8; 364/243; 364/243.4; 364/243.41; 364/243.42; 364/243.44; 364/247; 364/247.5; 364/255.1; 364/255.2; 364/261.3; 364/261.7; 364/263.1

[58] Field of Search ... 364/200 MS File, 900 MS File

[56] References Cited

U.S. PATENT DOCUMENTS

| | | | |
|---|---|---|---|
| 2,987,704 | 6/1961 | Gimpel et al. | 364/900 |
| 3,559,183 | 1/1971 | Sussenguth | 340/172.5 |
| 3,585,605 | 6/1971 | Gardner et al. | 364/200 |
| 3,936,182 | 2/1976 | Sheikh | 364/900 |
| 3,940,741 | 2/1976 | Horikoshi et al. | 340/172.5 |
| 4,058,850 | 11/1977 | Sheikh | 364/900 |
| 4,077,059 | 2/1978 | Cardi et al. | 364/200 |
| 4,109,310 | 8/1978 | England et al. | 364/200 |
| 4,115,853 | 9/1978 | Dummermuth | 364/900 |
| 4,148,098 | 4/1979 | McCreight et al. | 364/200 |
| 4,173,783 | 11/1979 | Couleur et al. | 364/200 |
| 4,181,934 | 1/1980 | Marenin | 364/200 |
| 4,200,927 | 4/1980 | Hughes et al. | 364/200 |
| 4,370,711 | 1/1983 | Smith | 364/200 |
| 4,435,756 | 3/1984 | Potash | 364/200 |
| 4,477,872 | 10/1984 | Losq et al. | 364/200 |
| 4,594,653 | 6/1986 | Iwashita et al. | 364/200 |
| 4,679,141 | 7/1987 | Pomerene et al. | 364/200 |
| 4,750,112 | 6/1988 | Jones et al. | 364/200 |
| 4,763,245 | 8/1988 | Emma et al. | 364/200 |
| 4,764,861 | 8/1988 | Shibuya | 364/200 |
| 4,775,927 | 10/1988 | Hester et al. | 364/200 |
| 4,777,587 | 10/1988 | Case et al. | 364/200 |
| 4,794,521 | 12/1988 | Ziegler et al. | 364/200 |
| 4,797,814 | 1/1989 | Brenza | 364/200 |
| 4,825,412 | 4/1989 | Sager et al. | 365/49 |

*Primary Examiner*—Gareth D. Shaw
*Attorney, Agent, or Firm*—Wolf, Greenfield & Sacks

[57] ABSTRACT

A method and apparatus for accessing a selected entry in a first memory by means of an index formed by combining an index and a stored backpointer of a second memory's entry corresponding to the selected entry in the first memory.

21 Claims, 7 Drawing Sheets

PREDICTION LOGIC MODULE

METHOD AND APPARATUS FOR INDEXING, ACCESSING AND UPDATING A MEMORY

BACKGROUND OF THE INVENTION

The present invention relates generally to the field of digital computer architecture and, in particular, to apparatus for processing instructions in high speed data processing systems.

One form of known digital computer, a pipelined system, concurrently processes a succession of instructions, each executed in part at each of a succession of stages. After the instruction has been processed at all of the stages, the execution is complete. With this processor configuration, as an instruction is passed from one stage to the next, it is replaced by the next instruction in the program. The stages together form a "pipeline" which at any time is simultaneously processing a succession of instructions flowing through the pipelined processor. A further description of the operation of pipelined processors can be had by reference to commonly assigned U.S. patent application, entitled "Data Processing Apparatus and Method Employing Instruction Flow Prediction", Ser. No. 578,872, filed Feb. 27, 1984 now U.S. Pat. No. 4,777,594 the specification of which being incorporated herein.

When a digital computer encounters a branch instruction, an instruction indicating a possible change from the normally orderly sequential execution of instructions, it is wasteful of computer resources to wait for decoding of the instruction before proceeding with the next instruction to be fetched for execution, and yet branch instruction decoding would appear at first blush to be necessary in order to determine the branch outcome, that is, the target address of the next instruction. Consequently, pipelined systems commonly utilize branch prediction mechanisms to predict the outcome of branch instructions before the execution of the instruction, and to guide prefetching of instructions. If a prediction is successful the computer will function without a delay in processing time due to decoding of the branch instruction.

Accordingly, it is a known advantage to provide a mechanism to predict a change in program flow as a result of a branch instruction. It has been recognized, however, that there is a time penalty for an incorrect prediction of program flow. This time loss occurs, for example, when instructions issue along the incorrect path selected by the branch prediction mechanism, and/or conditionally issued instructions along the correct path are cancelled.

Several approaches to improving branch prediction are known in the art.

U.S. Pat. No. 3,559,183 to Sussenguth teaches the reduction of branch penalty through the use of registers to store branch history tables. The tables are accessed by instruction addresses which are cross-referenced with branch target addresses to indicate whether a taken branch were previously encountered at a specified instruction address and, if so, the target address of that branch on its previous execution. This target address is then used to redirect instruction prefetching because of the likelihood that the branch will repeat its past behavior.

U.S. Pat. No. 3,940,741 to Horikoshi teaches a memory for storing branch target addresses in corresponding relationship to the branch target instructions, the memory being referenced by the branch target address which is used for prediction purposes.

U.S. Pat. No. 4,200,927 to Hughes teaches a branch processing mechanism using a field of three branch status bits of an instruction queue register to store signals indicative of the type of instruction to be executed, e.g., no branch, branch on condition, or other conditional branch instruction.

U.S. Pat. No. 4,435,756 to Potash teaches the use of encodings in a fetched conditional branch instruction which predict the state of the branch condition to be tested, and a pre-fetch means which fetches the next instruction based on the predicted state.

U.S. Pat. No. 4,477,872 to Losq teaches a method of improving guess accuracy of the prediction of the branch instruction outcome, but not its target address, by utilizing at decode time a table which records the history of the outcome of the branch.

In yet another approach, the reduction of branch penalty is attempted through the use of branch cache memory structures in conjunction with prediction logic. These are utilized to permit expedited predictions of non-sequential program flow following a branch instruction, prior to determination that the instruction is capable of modifying program flow. Branch cache is a fast access storage system which holds currently used branch information such as branch addresses within the central processor itself. A prediction using such an approach does not require computation of the branch address before instruction prefetching can continue because target and branch addresses are locally stored in the branch cache. This information is used to make predictions based solely on previous instruction locations, thereby avoiding the wait for decoding of the current instruction before proceeding with pre-fetch of the next instruction.

An advantage of branch prediction using branch cache memory structures is the potential of substantially reducing delays associated with branching. There remain, however, possible delays due to incorrect prediction of branches. There are also possible delays associated with cache access time for branch targets.

To reduce cache access time, indexing of the branch cache structures has proven successful. Typically, a portion of the branch address of each entry stored in the branch cache structure is used as an index to that entry. For example, the least significant bits ("LSB"), the bits with the smallest numerical value at the right end of a word, can be used as the index and an entry can be stored at locations in the branch cache structure corresponding to that LSB.

A disadvantage of the indexing technique is that, of course, more than one entry can share the same LSB, but have different higher order bits which are known as the most significant bits ("MSB"). Absent means to narrow the selection to a single entry, a "collision" results. Consequently, to avoid "collisions" and impose prediction accuracy, a technique to validate or confirm the branch cache entry as a suitable prediction must be employed.

Exemplary of branch prediction using an indexing technique is U.S. Pat. No. 4,370,711 to Smith which teaches a branch predictor using random access memory ("RAM"). Recent branch history is used to predict the branch decision through the use of an index hashed from the instruction address, for example, the LSB, in combination with a count stored in the RAM at a corresponding hash address location. The count is incremented or decremented to indicate branch outcome. The count serves also to indirectly validate branch address selection by influencing the prediction according to the way a "majority" of the more recent decisions were made, by effectively "voting" among the branch instructions mapping to the same memory locations.

A more direct method of confirming the selection of the branch address to be predicted and avoid collisions altogether is to use the full MSB as a tag. This indexing technique encompasses the steps of locating a branch cache entry by matching the LSB of a fetched branch instruction address with a location address of the branch cache structure and then validating the match by comparing the MSB of the entry stored at the location with the MSB of the fetched instruction. If the MSB matches, then the entire fetched branch instruction corresponds to the branch cache entry and, generally speaking, a prediction using that entry can be made.

Unfortunately, the index - MSB tag technique just described uses the entire branch address which, with segment offsets, segment number and process identification code, can amount to a relatively large number of bits, for example, 46 bits. The memory size, pin-outs, logic devices and other hardware needed to implement this technique can be costly.

Accordingly, an object of the invention is to provide an improved system for indexing and accessing a memory.

A further object of the invention is to provide an improved memory cache system useful in the formulation of branch target address predictions.

SUMMARY OF THE INVENTION

The invention achieves the above objects by providing a method and apparatus for indexing and accessing a memory, preferably for a pipelined digital computer. The system comprises a first memory for storing a plurality of instruction or other data in entries indexed by a first index, and a second memory for storing a plurality of branch instruction data in entries indexed by a second index. Each of the second entries corresponds to one of the first entries. For example, where the first entries includes instruction data, at least some of the instructions are branch instructions which have target addresses stored in the second memory. The first and second indexes comprise a plurality of bits, and for those first entries having corresponding second entries, the first index for each of the first entries comprising the sum of all of the bits of the second index for the corresponding second entry plus additional bits. The additional bits are stored in the second memory as a data field at locations associated with the corresponding second entry. The additional bits serve as a backpointer. When a selected entry in the first memory is to be accessed, its index is formed by combining the index and backpointer of the corresponding entry in the second memory.

In accordance with other aspects of the invention, the first memory is, for example, an instruction cache and the second memory, for example, is a branch cache. The branch cache is considerably smaller in capacity than the instruction cache. Each of the entries in the branch cache and the instruction cache are indexed using an index hashed from their instruction address. Where corresponding entries are stored, preferably the instruction cache index includes all of the branch cache index plus additional bits of the instruction address. These additional bits are used as a backpointer, and are stored in a data field in the branch cache in locations associated with the corresponding branch target address stored therein. Access can be had to a selected entry in the instruction cache by generating the appropriate instruction cache address by combining the backpointer with the branch cache index, i.e., the location address in the branch cache, of the selected entry. Preferably, both indexes are formed from the lowest significant bits of the instruction address.

The invention will next be described in connection with certain illustrated embodiments. However, it should be clear that various changes, modifications and additions can be made by those skilled in the art without departing from the scope of the invention as defined in the claims.

BRIEF DESCRIPTION OF THE DRAWINGS

For a fuller understanding of the nature, aspects and objects of the invention, many but not all of which having been described heretofore, reference should be made to the following detailed description and the accompanying drawings, in which.

Figure 1:
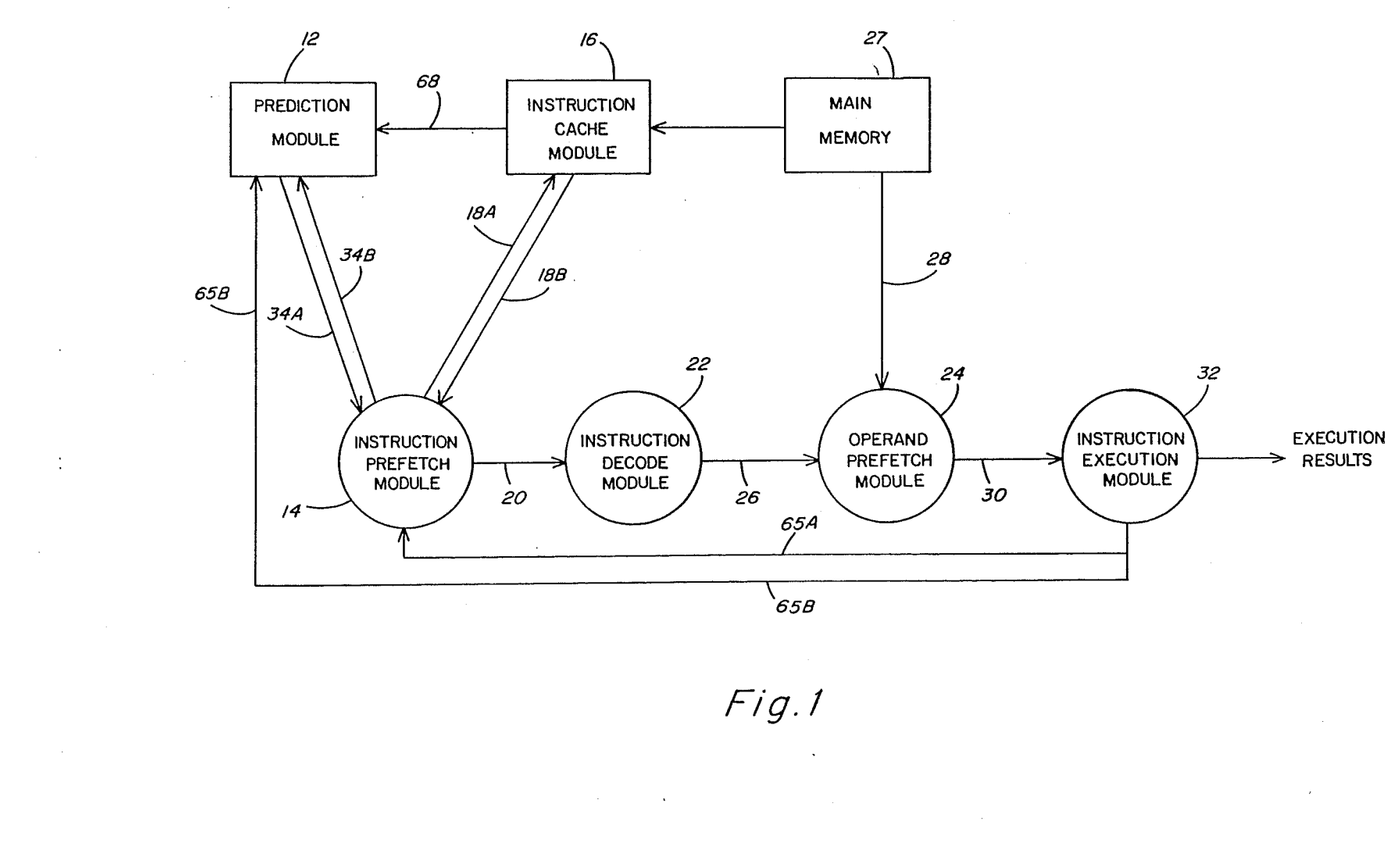
FIG. 1 is a functional block diagram of a pipelined computer system incorporating a branch prediction module according to the invention.

DESCRIPTION OF THE PREFERRED EMBODIMENT a. Pipelined Processing & Branch Prediction Module FIG. 1 is a block diagram of some of the major components of a piplelined computer 10 having a look ahead or predictive pre-fetch system employing a branch prediction module 12. Instruction pre-fetch module 14 fetches selected instructions out of an instruction cache 16, the data being received over bus 18B. If the instruction cache 16 does not contain the instruction being fetched, it responds to an inquiry from the pre-fetch module 14 by obtaining the selected instructions from main memory 27 over bus 19 and storing it for future use. The pre-fetch module then transmits the obtained instruction over bus 20 to an instruction decode module 22. The instruction cache 16 is a fast acting, limited size memory and includes a plurality of memory locations comprising a field of data representative of a Plurality of binary codes that specify the operations to be performed, known as "op codes", for each fetched instruction and an operand or literal which for a branch instruction comprises a corresponding field for storing data representative of a plurality of target branch addresses. After the instruction is decoded, the instruction is passed to an operand pre-fetch module 24 over bus 26. Operand pre-fetch module 24 fetches operands out of a main memory 27 over bus 28 and passes both the decoded instruction and the operand via bus 30 to an instruction execution module 32 which, in turn, generates instruction results. Branch prediction module 12 is by means of bus 34A, 34B in communication with the instruction pre-fetch module 14, from which the branch prediction module 12 receives the address of a current instruction pre-fetch. Branch prediction module 12 provides either a predicted address of a next instruction to be pre-fetched or instructs the instruction pre-fetch module to increment the program counter and process the next sequential instruction.

Figure 2:
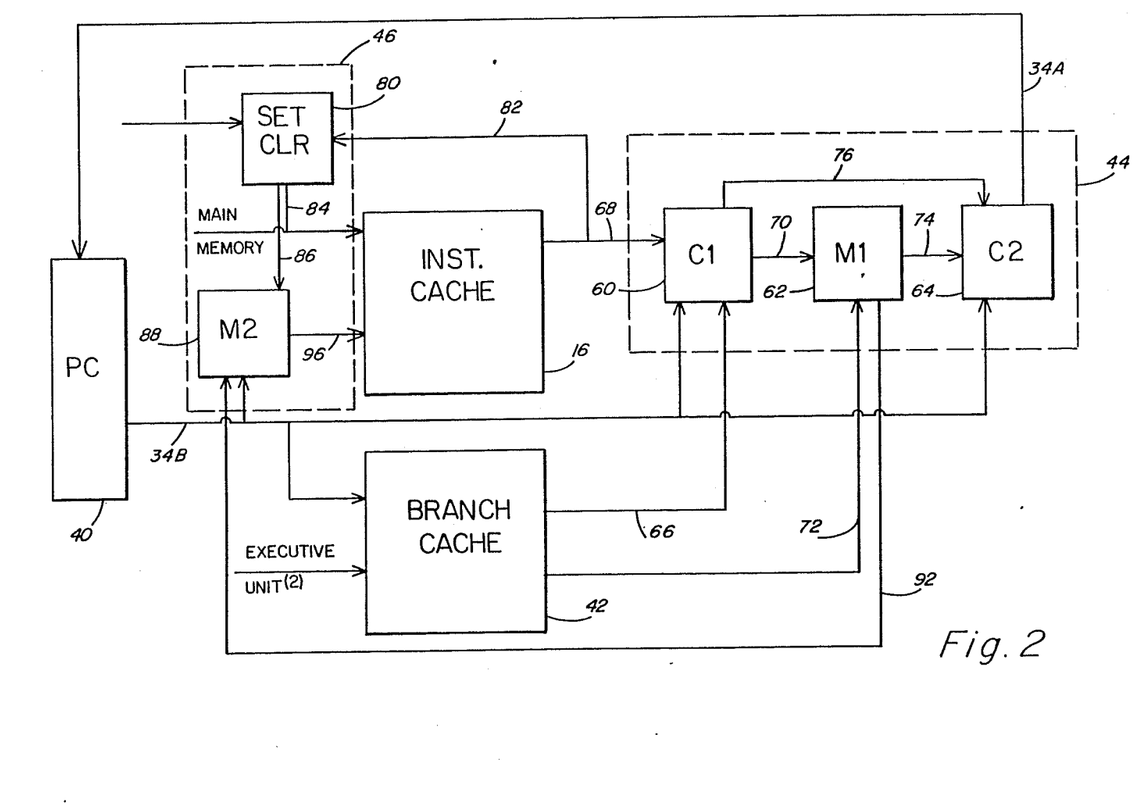
FIG. 2 is a functional block diagram of the branch prediction module, and related systems.

Shown in FIG. 2 is the branch prediction module 12 and associated hardware in further detail, operatively coupled by bus 34A, 34B, with the instruction pre-fetch module 14.

More specifically, the program counter 40 included in the pre-fetch module 14 identifies an instruction to be fetched by its address and provides this data to the instruction cache 16 as described above, as well as to the prediction module 12 (FIG. 1) over bus 34B.

The prediction module 12 includes a branch cache structure 42, prediction logic module 44, and coupling bit set clear logic module 46, as shall be more fully explained below.

Figure 3:
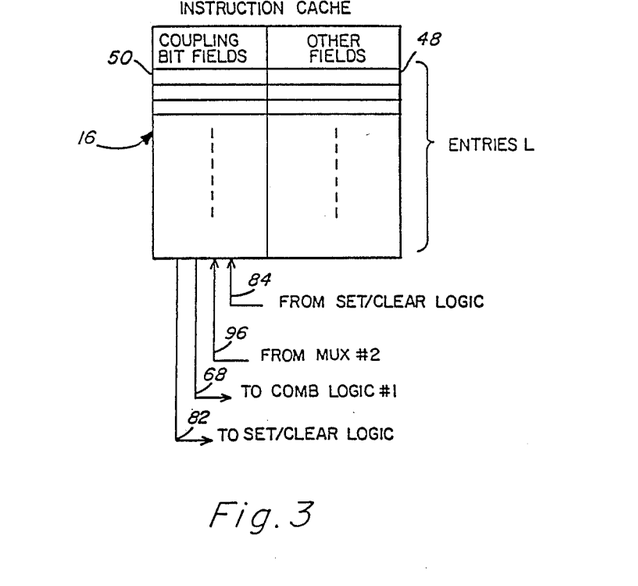
FIG. 3 is a functional block diagram of an instruction cache in accordance with the invention.
Figure 4:
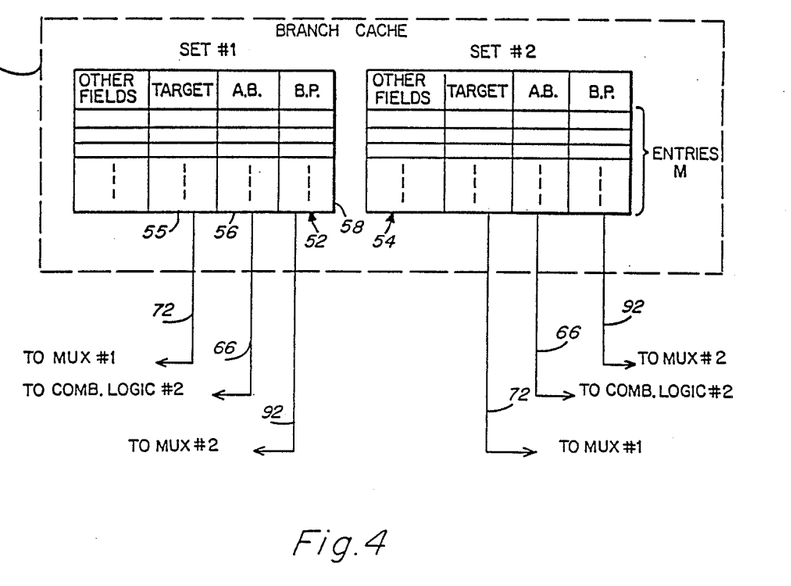
FIG. 4 is a functional block diagram of a multi-set branch cache in accordance with the invention.
Figure 5:
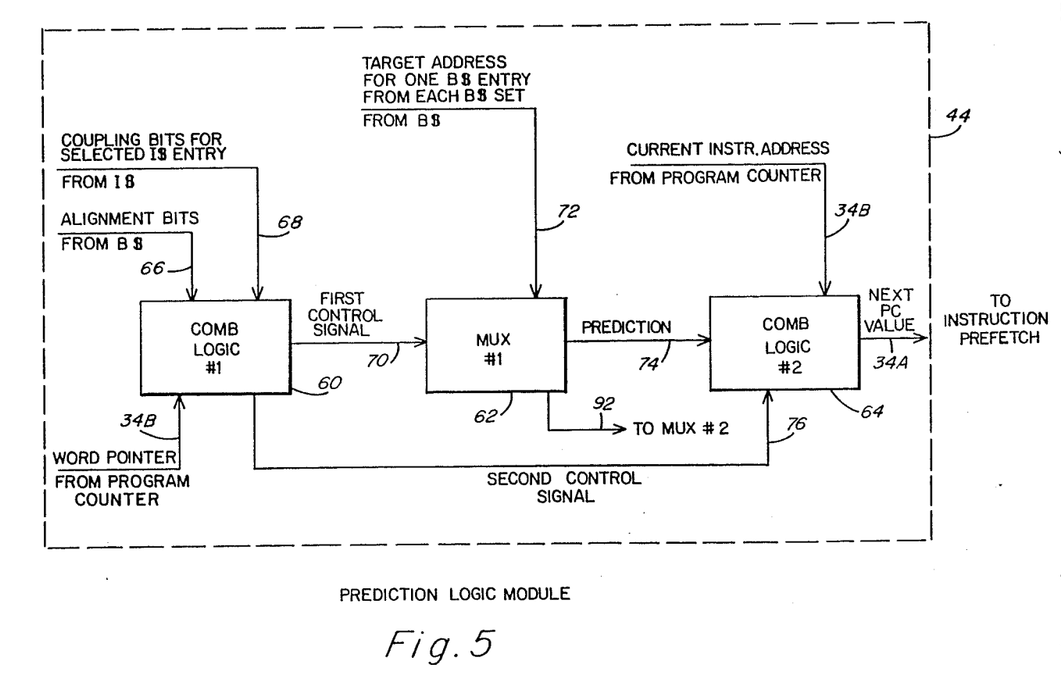
FIG. 5 is a functional block diagram of a prediction logic module in accordance with the invention.

To more readily convey an understanding of FIG. 2, its various blocks shall be explained with the aid of FIGS. 3 through 5.

b. Instruction Cache

The instruction cache 16 is illustrated in FIG. 3 as comprising a plurality of associated fields for the storage of data, each of which being capable of accommodating an entry. The maximum number of entries which can be designated "L," where L is a positive integer. The figure depicts, in block form, the other fields, generally identified by the number 48 and, in accordance with the invention, a coupling bit field 50. Each of the so called other fields 48 includes memory locations for the address of recently encountered instructions. The purpose of the coupling bit field shall be explained below in great detail. Unlike the embodiment as shown, wherein the coupling bit field is an integral part of the instruction cache 16, if desired, one skilled in the art can provide a coupling bit field in the form of a separate RAM (not shown) whose entries are associated with the entries stored in the instruction cache 16, whose fields are as deep as the instruction cache 16 is deep, and which shifts in step therewith.

c. Branch Cache

The branch cache structure 42 shown in FIG. 4 is a local memory structure for the prediction module 12 of FIG. 2. A further understanding of branch cache structures and related hardware and their operation can be had by reference to the aforementioned patent application Ser. No. 578,872.

As is shown in FIG. 4, the branch cache structure 42 includes a plurality of branch cache sets, two being shown for illustrative purposes, identified as branch cache Sets 1 and 2, preferably in the form of first and second RAMS 52, 54. RAM 52 includes a set of memory locations which collectively comprise branch cache Set 1. Similarly, RAM 54 includes a set of memory locations which collectively comprise branch cache Set 2. The branch cache Sets 1 and 2 store branch target addresses indexed by the LSB's of the instruction addresses, and other associated information.

Thus, in addition to a target address field 55, each branch cache set includes an alignment bit field 56 and a back pointer field 58. Each of the alignment bits, for example, is the lowest significant bit of the branch instruction address. The backpointers shall be discussed below, and are used in conjunction with the coupling bits. Each branch cache set is "m" deep, i.e., can store up to m entries, where m is a positive integer and substantially less than L, the depth of the instruction cache. Therefore, considerably fewer entries can be stored in each branch cache set than the number of entries which can be stored in the instruction cache 16.

To generalize, the branch cache structure 42 includes "n" sets, where n is a positive number. In the foregoing example, n=2 which means simply that two branch cache sets are provided. The branch cache structure 42 is n×m entries in size. It should be understood, however, that the invention can be practiced with a single branch cache set, i.e., n=1.

In accordance with the invention, the coupling bits stored in association with each entry in the instruction cache 16 form a code which identifies whether a corresponding entry is stored in the branch cache structure 42, and, if so, which of the branch cache sets contains the entry. The coupling bit field is as wide as the number of branch cache sets, that is, the coupling bit field is "n" wide. In other words, the coupling bit field is L×n in size, where L and n are positive integers.

For example, if as illustrated, two branch cache sets are used, two coupling bits exist in the coupling bit field, one assigned to each of the branch cache sets. To illustrate, the following matrix gives all possible values for the coupling bits:

|  | Branch Cache Sets | |
| --- | --- | --- |
|  | Set 1 | Set 2 |
| Coupling Bits | 0 | 0 |
|  | 0 | 1 |
|  | 1 | 0 |
|  | 1 | 1 |

If the first coupling bit has a logic value of zero, and the second coupling bit has a logic value of binary 1, then, for example, the branch cache Set 2 contains an entry corresponding to the entry in the instruction cache associated with the coupling bits, and this condition is referred to as a "hit" in Set 2. By the same token, if the coupling bit associated with the Branch Cache Set 1 has a logic value of binary one, while the other is zero, then Set 1 contains the entry and this condition is referred to as a "hit" in Set 1. If both coupling bits are zero, the entry is not contained in either of the branch cache sets, and this condition is referred to as a "miss" on both sets. If both have a logic value of binary 1, both branch cache Sets 1 and 2 contain an entry corresponding to the entry in the instruction cache associated with the coupling bits. Such a "multiple hit" can occur for example where a single instruction cache entry contains information pertaining to two branch instructions.

d. Prediction Looic Module

FIG. 5 depicts the prediction logic module 44, as comprising a first combinational logic module 60, a first multiplexor 62, and a second combinational logic module 64.

The first combinational logic module 60 receives as inputs a word pointer, e.g., the lowest significant bit or bits of an instruction address associated with a currently fetched instruction, from the program counter 40 (FIG. 2.), alignment bits over bus 66 from the branch cache structure 42 and coupling bits associated with the fetched instruction from the instruction cache 16 over bus 68.

For example, where the instruction cache includes 64 bits with 16 bit boundries, there are two alignment bits and two word pointer bits to indicate the beginning of an instruction.

The first combination logic module 60 outputs a first control signal used to qualify a selected branch target address to be used in formulating a prediction.

The first control signal is sent to the first multiplexer 62 over bus 70, which also receives a digital signal from the branch cache structure 42 (FIG. 2), e.g., a target address of one branch cache entry from each set over bus 72. To understand how the system selects which branch target addresses, if any, to transmit to the first multiplexor 62, a greater familiarity must be had of the operation of the branch cache.

The branch cache structure is set associative and not fully associative, so the value of the program counter is used to identify the memory location in the branch cache sets in which a corresponding entry to that value is stored.

Each branch cache set has a plurality of memory locations indexed by the lowest significant bits of the branch instruction address. Because of this, each of the branch cache sets will have a memory location with the same index as the other sets. For example, if the LSB's were "015", the entry in each of the sets corresponding to location "015" would be transmitted to the first multiplexer 62. The first multiplexer 62 uses the control signal to determine which of the entries, if any, from all of the sets are to be used in the formulation of a prediction.

The coupling bits contribute to this process by identifying which of the branch cache sets contains the desired entry. Each stored entry has an associated coupling bit vector ("c-vector") in the form of a digital expression. The index combined with the "c-vector" uniquely identifies whether an entry is stored in the branch cache structure corresponding to the program counter value, and, if so, the system can retrieve that entry and formulate its prediction.

Thus, it can be understood that the first combinational logic module handles the question: "Is there a branch entry in any branch cache set suitable for further testing in the formulation of a prediction?" It performs a screening function. If the answer is no, then the pre-fetch module is informed that the next instruction should result from the incrementing of the program counter value. This is the case if all coupling bits are zero. However, it is also the case if one or more of the coupling bits have been set to indicate that an entry does exist in the branch cache structure, but the program counter is past the address of the instruction with which the branch cache entry is associated, and, therefore, a prediction is inappropriate. This is achieved in accordance with the invention by comparing the word pointer from the program counter with the alignment bit field. Where the word pointer is larger than the alignment bit field, for example, the processor is already past the branch address and the prediction is inappropriate.

If the answer to the previously stated question is "yes", then the control signal is formed and transmitted to the first multiplexor so that the entries in the branch cache can be confirmed as candidates on which a prediction can be based.

A further understanding of the purpose and function of the word pointer and the alignment bits can be had with reference to commonly owned, U.S. Pat. No. 4,860,197, entitled "Branch Cache System with Instruction Boundary Determination Independent of Parcel Boundary", the disclosure of which being incorporated herein.

The first multiplexer 62 outputs the selected branch cache entry over bus 74 to the second combinational logic module 64. The second combinational logic module 62 forms the prediction and determines whether to use the target address selected by the first multiplexor or a different address. In addition to the selected entry, the second combinational logic module 64 receives the currently fetched instruction's address from the program counter over bus 34B, and a second control signal from the first combinational logic module over bus 76. If no appropriate entry exists in the branch cache, for example, on the initial start-up, the second control signal so informs the second combinational logic module 64. This prevents the module 64 from trying to use an erroneous signal from the first multiplexer 62. If the second control signal is received, then the second combinational logic module 64 simply increments the program counter value. Either a branch cache entry selected by the first multiplexer 62 or the incremented program counter value is then sent to the instruction pre-fetch module 14 over bus 34A as the prediction.

Accordingly, the invention utilizes the coupling bits in association with an indexed branch cache structure 42, indexed by the lowest significant bits of the instruction address, to select the suitable branch cache entry for further examination in the formation of a prediction. Thus, the need for storage of a tag field, such as the most significant bits of the instruction addresses, is avoided. The coupling bits are shorter in length than the most significant bits and, ergo, the memory space or size required for purposes of qualifying an entry is reduced.

Note that the prediction, to be of value, must be formulated within one clock cycle. The combinational logic modules and the first multiplexor must be quick acting.

The logic required for a prediction inquires in parallel whether a pre-fetched instruction was Previously encountered, and whether it is stored in the instruction cache and the branch cache. While we may think of the various stages in the prediction logic as operating sequentially, in practical terms, they are occurring concurrently. For the purposes of this specification, the term "concurrent" merely means that they happen during the same computer cycle.

To better understand the advantages of the invention, the analysis of an example might be of assistance.

For example, if the instruction cache were capable of containing 1,024 entries while the branch cache were capable of containing 256 entries, the instruction cache would obviously be of a much larger size. For this reason, a considerably smaller index could be used for the branch cache structure. It is desirable to use as small an index as possible so as to save hardware and time. For example, where an instruction address typically contains 16 bits, the 10 least significant bits can be used as an index for the instruction cache structure entries. In the prior art, this would leave a tag field of 6 bits which form the MSB's, the most significant bits. In the present invention, the branch cache uses only the 8 least significant bits as its entries index rather than the 10 for the instruction cache. By the same token, the tag field of 6 bits which would have been used as a tag in the prior art is replaced in the invention by a coupling field of only 2 bits. Thus, hardware requirements are reduced. This example shall be referred to several times hereinbelow.

During flushing of the pipelined processor, which is a term generally well understood by one in the art, the address of the first instruction not completed prior to the flush is placed in the program counter. This causes it to be re-tried in the prediction module. Whenever a branch instruction does not have its target address predicted by the prediction module, the pipelined processor is flushed, and another attempt is made to predict the target address. An incorrect prediction of the target of a branch instruction execution module 32 which transmits to the program counter the address of the branch instruction over bus 65A, and results in a signal from hardware such as the instruction execution module 32 which transmits to the prediction modules' branch cache structure the target address of the branch instruction and to the set/clear and addressing logic data pertaining to the changing of corresponding coupling bits, as described hereinbelow, over bus 65B.

e. Backpointer

As stated above, in the branch cache is stored a backpointer corresponding to each entry. The backpointer field in each branch cache set preferably consists of 2 bits. Returning to the example given above, wherein the index into the instruction cache consists of 10 bits and the index into the branch cache consists of 8 bits, the difference between the 2 indexes of 2 bits is stored as a data field in the branch field and forms the backpointer. Note that this is a data field and not an address field while the data is being stored.

To generalize the foregoing, with an x bit index into the instruction cache, and a y bit index into the branch cache, a backpointer consisting of x minus y, or z data bits is required.

The purpose of the backpointer can be quite simply explained. If the branch cache set is filled beyond its capacity, a writer over-rights one the entries therein, typically on a first-in-first-out basis, upon the encountering of yet an additional pre-fetched branch instruction. The backpointer is used to clear the coupling bits in the instruction cache corresponding to the over-ridden instruction in the branch cache. In order to find the corresponding coupling bits, the instruction cache must be entered into with the aid of an index formed by combining the branch cache index with the additional bits of the backpointer field.

Returning to the example, the 8 bits of the branch cache index plus the 2 bits of the backpointer field together form the 10 bit index of the instruction cache index. It is desirable to use this technique rather than to use an identically sized index for both the instruction cache and the branch cache since access time in general is reduced for accessing the branch cache and smaller RAMs' are required if the smaller index is utilized. Of significance is that the backpointer consists of data bits, not address bits. However, when used, the backpointer bits, together with the branch cache index, constitute the index for the instruction cache which, as stated above, is part of the instruction address.

The backpointer need only be used when an entry into the branch cache is overwritten.

f. Coupling Bit Set/Clear & Addressing Looic

Figure 6:
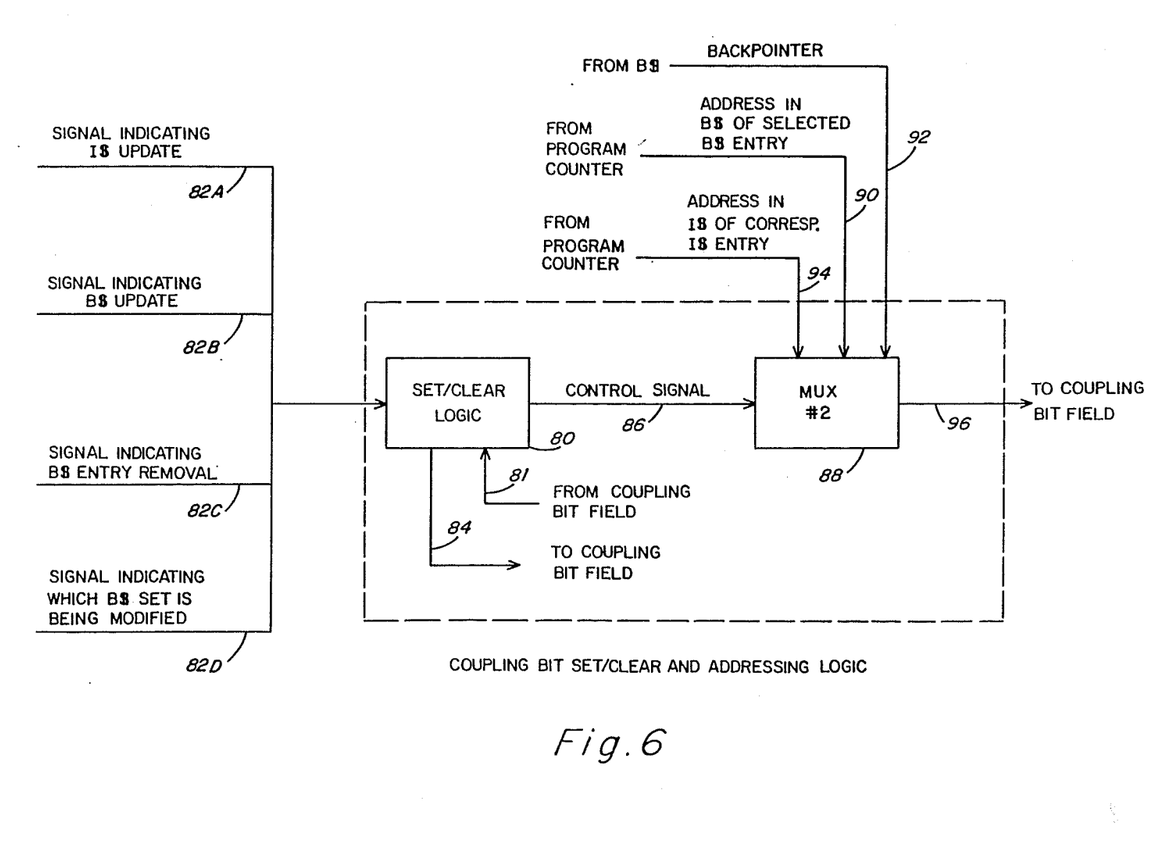
FIG. 6 is a functional block diagram of coupling bit set/clear and addressing logic in accordance with the invention.

FIG. 6 shows the coupling bit set/clear and addressing logic. A set/clear logic module 80 receives a digital signal from the coupling bit field over bus 81 providing the current value of the coupling bit field. It also receives signals indicating whether an instruction cache or a branch cache update is occurring over buses 82A and 82B, respectfully, a signal indicating the removal of an entry from the branch cache during overwrite over bus 82C, and a signal indicating which branch cache set is being modified over bus 82D. It outputs a control signal to the coupling bit field over bus 84 to change an appropriate bit of a selected coupling bit vector from a first to a second value so as to indicate by said value and the identity of the bit so changed that data representative of a branch target address is stored or no longer stored in a respective branch cache set. The set/clear logic also outputs a signal over bus 86 to a second multiplexor 88 whenever an entry is to be removed from branch cache.

For an instruction cache update, the coupling bit field is zeroed. For a branch cache update the coupling bit corresponding to the branch cache set is changed to indicate an entry exists in branch cache. During removal of a branch cache entry the coupling bit corresponding to the branch cache set is zeroed to indicate that the entry no longer exists in branch cache. During updating and removal, all other coupling bits remain unchanged.

The second multiplexor 88 also receives the address of the entry in the branch cache over bus 90, the backpointer corresponding thereto over bus 92 from the first multiplexor 62 (FIG. 2), and the address of a selected entry from the program counter (FIG. 2). It uses these to formulate the address of an instruction cache entry having a particular coupling bit code which must be changed due to overwriting of an entry in the branch cache. This is outputted as the desired instruction cache index over bus 96.

Thus, it can be seen that, unlike the prior art in which a tag field had to reside in the branch cache, a limited sized field of coupling bits in or associated with the instruction cache is used to qualify branch cache set entries in the formation of a prediction of branch target addresses. The advantage to be gained is the reduction of hardware, including the reduction in RAMs and comparator devices, as well as the speeding up of the critical path of the processor. It should be understood that the branch cache must make a prediction every cycle and therefore, if the operations of the branch cache come into the critical path of the branch prediction, they can have a dramatic affect on the speed of operation of the entire processor or the effectiveness of the prediction module.

g. Prediction Algorithm

Figure 7A:
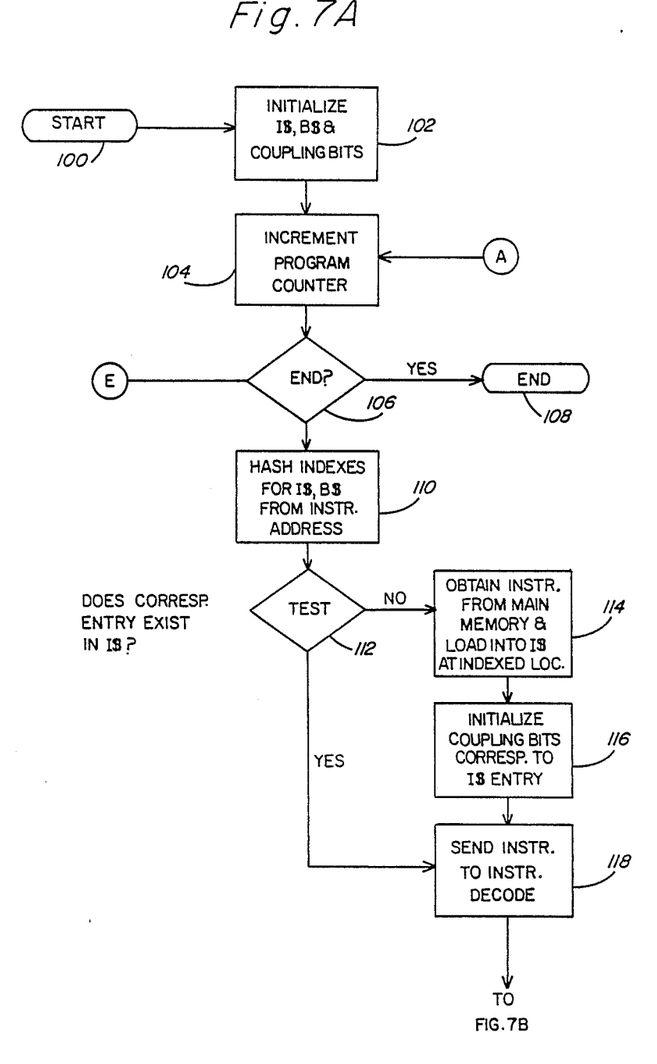
FIG. 7 is a diagrammatic representation of an algorithm in accordance with the invention.
Figure 7B:
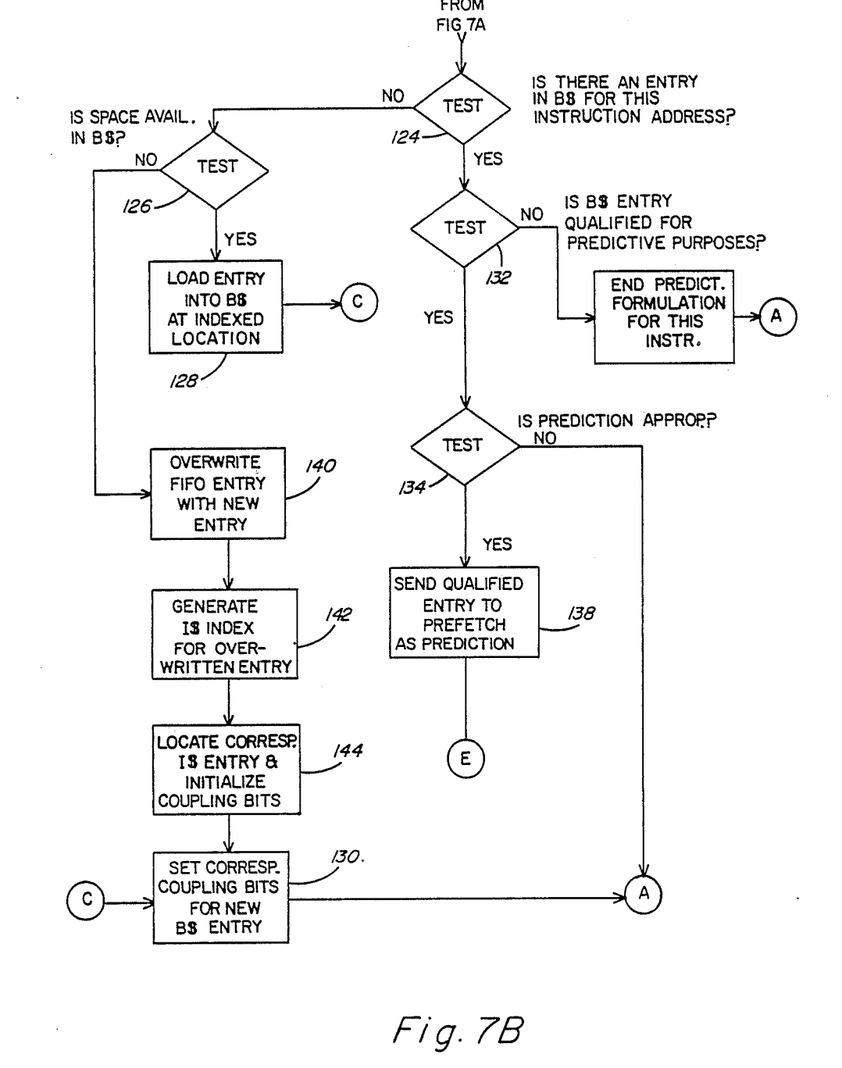

An algorithm for formulating a predicted target address for branch instructions is illustrated in FIG. 7. While it is self-descriptive, a brief further explanation may be helpful.

Of course, on start-up or machine resets (Block 100), it is important to effect the initialization (Block 102) of the system. The instruction cache, the branch cache and the coupling bits are zeroed or cleared.

In the next step, the first program counter is incremented (Block 104). A test is made of whether the last instruction in the program has been processed (Block 106). If it has, the algorithm ends (Block 108).

The branch cache and instruction cache indexes are hashed from the instruction address (Block 110). Then the instruction is fetched from the instruction cache (Block 112).

To assure that the entries in the branch cache and the instruction cache correspond, it is important that the same hashing algorithm be used for each. Thus, the index used to fetch an instruction from the branch cache, together with additional bits hashed from the instruction's address, is used to fetch an instruction from the instruction cache. According to the example given above, the index for the instruction cache includes 10 bits of the LSB's of the address while the index of the branch cache includes only 8 bits of the LSB's.

Since the system has been initialized, an inquiry into the instruction cache utilizing the LSB's of the address of the fetched instruction as an index, results in a miss. The data corresponding to the first fetched instruction is then loaded into the instruction cache by conventional implementation means. In effect, this requires the obtaining of the needed data from the main memory for use in updating the instruction cache (Block 114). With this update, the associated coupling bits are set to zero (Block 116). The pre-fetch module transmits this instruction to the instruction decode module for further processing (Block 118).

Additionally, an inquiry is made into the branch cache sets by means of the index comprising the LSB's of the branch instruction to determine if a corresponding entry is stored therein (Block 124). With the coupling bits zeroed, this results in a miss. Therefore, the next instruction, the target instruction of the branch executed by the execution module, will not have been predicted. Since the next instruction was not predicted, an entry is written into the branch cache corresponding to that branch instruction (Block 128). That information includes, written at an offset, the target address as well as the word pointer and the backpointer. Additionally, a controller directs entry into the instruction cache for the purpose of setting of the coupling bits representative of the branch cache set in which the corresponding entry is stored (Block 130).

The appropriate indexes hashed from the instruction address are presented to both the instruction cache and the branch cache. For instruction cache entry selection, typically, the index is used to select the possible entry being sought, and then the tag field is compared to validate the selection. For branch cache entry selection, the index is used to retrieve an entry and the coupling bit code for that entry obtained from the instruction cache is used to validate that entry and qualify it for purposes of forming the prediction (Block 132). The coupling bit code corresponding to that entry is routed to the prediction logic module which also receives the branch cache entry selection, the alignment bit field for that entry, the word pointer for the current instruction, and other information. The prediction logic module combines these to qualify the entry and form the prediction (Block 134). If the processor is passed the instruction address corresponding to the branch cache entry, the prediction is inappropriate and therefore, the prediction formulation ends. Otherwise the prediction is sent to the pre-fetch module (Block 138). The next step is to once again test if the end of the program has been reached.

In the preferred embodiment, only one entry at most from each branch cache set is selected for testing by the prediction logic module.

Access time for the RAM's as well as the cycle time for the process prevents using the alignment bits plus coupling bits to limit the number of sets requiring testing. In other embodiments of the invention, the coupling bits may be utilized to limit the number of sets for testing by flagging the set containing the entry and then using the index to obtain that entry.

In the event a fetched branch instruction does not have a corresponding entry in the branch cache, and the branch cache has been filled, it becomes necessary to over-write an entry already therein (Block 140). The information of the over-written entry is therefore lost. Because of this, the first entry stored in the branch cache is selected to be over-written, that is, "first in, first out."

With the removal of the over-written entry from the branch cache, the corresponding coupling bit code must also be changed so as to no longer identify that entry as being stored in that branch cache set. To do this, the instruction cache entry corresponding to the branch cache entry is accessed, by generating and using the appropriate instruction cache index (Block 142). The appropriate instruction cache index is formed by combining the branch cache index for that entry with the back pointer bits for that entry which are stored with that entry in the branch cache. The corresponding instruction cache entry is located using this formed index, and the corresponding coupling bits are initialized to indicate no corresponding branch cache entry exists. Of course, the new branch cache entry which replaced the over-written entry must then have its associated coupling bits set to identify in which branch cache set it is stored.

The invention has been described in connection with an embodiment which utilizes a two set branch cache the invention can also be practiced in an embodiment which employs more than two branch cache sets.

It will thus be seen that the invention effectively attains the objects that are set forth above. It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense. It is also to be understood that the following claims are intended to cover all the generic and specific features of the invention as described herein, and all statements of the scope of the invention which, as a matter of language, might be said to fall therebetween.

What is claimed:

1. A method of indexing and accessing a memory, comprising:
   storing a plurality of data entries in an instruction cache memory at a plurality of locations, each of said instruction cache data entries including a coupling bit field,
   storing a plurality of data entries in a plurality of branch cache memories, having a plurality of locations, each of said branch cache data entries having a corresponding instruction cache data entry, and including a backpointer field,
   indexing said instruction cache locations by means of a first index,
   indexing said branch cache locations by means of a second index,
   determining from the coupling bit field of a first instruction cache data entry, which one of said plurality of branch cache memories contains a corresponding branch cache data entry,
   accessing said corresponding branch cache data entry of said one branch cache memory whose second index comprises a portion of the first index of said first instruction cache data entry, combining the second index and backpointer field of the corresponding branch cache data entry thereby reconstructing the first index of said first instruction cache data entry, accessing said first instruction cache data entry with said reconstructed first index, and updating the coupling bit field of said first instruction cache data entry acccessed by said reconstructed first index.

2. The method of claim 1 wherein each of said branch cache data entries contains a branch target address whose corresponding branch instruction is contained in one of said instruction cache data entries.

3. A cache memory system for a pipelined digital computer, comprising:
- instruction cache means having a plurality of instruction cache locations for storing a plurality of instruction cache data entries, each of said instruction cache data entries having an associated coupling bit field, each of said instruction cache locations accessible by a first index,
- branch cache set means having a plurality of branch cache locations for storing a plurality of branch cache data entries, a plurality of said branch cache data entries having a corresponding instruction cache data entry, each of said branch cache locations accessible by a second index comprising a portion of the first index of said corresponding instruction cache data entry, said branch cache data entries each including a back pointer field,
- means responsive to one of said first indexes for accessing one of said corresponding instruction cache data entries,
- means responsive to the second index and backpointer field of said at least one branch cache data entry for reconstructing the first index of said corresponding instruction cache data entry, and
- means responsive to said reconstructed first index for accessing the instruction cache location containing said corresponding instruction cache data entry and for initializing said associated coupling bit field, 4. The cache memory system of claim 3 in which said corresponding instruction cache data entry comprises a branch instruction.

5. The cache memory system of claim 4 wherein said corresponding instruction cache data entry further comprises a coupling bit field.

6. The cache memory system of claim 5 wherein said at least one branch cache data entry further comprises a branch target address, whose corresponding branch instruction is contained in said corresponding instruction cache data entry.

7. The cache memory system of claim 5 wherein the coupling bit field of a said corresponding instruction cache data entry contains a binary expression indicating which of said plurality of branch cache means contains said at least one branch cache data entry.

8. The cache memory system of claim 3 wherein the first index of said corresponding instruction cache data entry comprises m instruction address bits of the instruction contained therein, where m is a position integer than one.

9. The cache memory system of claim 8 wherein the second index of said at least one branch cache data entry comprises n bits of the first index of said corresponding instruction cache entry, wherein n is a positive integer greater that zero but less than m.

10. The cache memory system of claim 9 wherein the backpointer field of said at least one branch cache data entry comprises the instruction address bits of said first index which are not present in the second index of said at least one branch cache data entry.

11. The cache memory system of claim 10 wherein said means for reconstructing said first index includes circuitry for combining the instruction address bits contained in the second index and backpointer field of said at least one branch cache data entry to generate the index of said corresponding instruction cache data entry.

12. The cache memory system of claim 11 wherein said means responsive to said reconstructed first index comprises circuitry for re-accessing said corresponding instruction cache data entry and circuitry for initializing the associated coupling bit field of said corresponding instruction cache data entry.

13. The cache memory system of claim 3 wherein said associated coupling bit fields are stored in a third memory means having a plurality of third locations, each of said third locations accessible by the first index of the instruction cache entry associated with said coupling bit field.

14. A cache memory system for a pipelined computer comprising:
- an instruction cache means having a plurality of indexed instruction cache locations, each containing at least an instruction and a coupling bit field, each instruction cache location having a first index comprising instruction address bits of the instruction contained therein;
- a branch cache set means having a plurality of indexed branch cache locations each containing at least a branch target address and a backpointer field, each branch cache location having a corresponding instruction cache location which contains a branch instruction, each branch cache location having a second index comprising a portion of the first index of its corresponding instruction cache location; and
- a first control circuit means, responsive to the first index and coupling bit field of one of said corresponding instruction cache locations for identifying at least one of said branch cache locations which contains a corresponding branch target address;
- a second control circuit means, responsive to the second index and backpointer field of said at least one branch cache location for reconstructing the first index of said corresponding instruction cache location in which a corresponding branch instruction is stored, and
- an update circuit means, responsive to said reconstructed first index for accessing said corresponding instruction cache location and modifying the coupling bit field contained therein.

15. The cache memory system of claim 14 wherein the first index of said corresponding instruction cache location comprises the m least significant instruction address bit of the instruction contained in said corresponding instruction cache location, where m is a positive integer greater than one.

16. The cache memory system of claim 15 wherein the second index of said at least one branch cache location comprises the n least significant instruction address bits of the corresponding first index, where n is a positive integer greater than zero but less than m.

17. The cache memory system of claim 16 wherein the backpointer field of said at least one branch cache location comprises the q most significant instruction address bits of the corresponding first index, where q is a positive integer greater than one and is equal to m minus n.

18. The cache memory system of claim 17 wherein said second control circuit means combines the m address bits of said second index wit the q address bits of said backpointer field of said at least one branch cache location to form the first index of said corresponding instruction cache location.

19. The cache memory system of claim 14 wherein said coupling bit field of an instruction cache location comprises a digital expression indicating which of said branch cache set means includes said at least one branch cache location containing a branch target address for the branch instruction stored in said corresponding instruction cache location.

20. The cache memory system of claim 19 wherein said coupling bit field comprises a plurality of bits, each of said bits representing a branch cache means, the binary value of each of said bits indicating whether the represented branch cache means contains a branch cache location corresponding to the instruction cache location in which the coupling bit field resides.

* * * * *